United States Patent [19]
Yokoi

[11] Patent Number: 5,241,010
[45] Date of Patent: Aug. 31, 1993

[54] ACRYLIC RUBBER COMPOSITION CONTAINING TRITHIOCGANURIC ACID, A METAL SUIT OF DITHIOCARBAMIC ACID AND A THIURAM SULFIDE

[75] Inventor: Kazuma Yokoi, Takahagi, Japan

[73] Assignee: Nippon Mektron Limited, Tokyo, Japan

[21] Appl. No.: 689,641

[22] Filed: Apr. 23, 1991

Related U.S. Application Data

[63] Continuation-in-part of Ser. No. 438,010, Nov. 20, 1989, abandoned.

[51] Int. Cl.$^5$ ................................................ C08F 8/34
[52] U.S. Cl. ............................. 525/328.9; 525/329.8; 525/330.4; 525/349
[58] Field of Search ............... 525/329.8, 330.4, 328.9, 525/349, 352

[56] References Cited

U.S. PATENT DOCUMENTS 3,622,547 11/1971 Ermidis ............................... 525/352
4,434,274 2/1984 Jablonski ............................ 525/349

*Primary Examiner*—Christopher Henderson
*Attorney, Agent, or Firm*—Lowe, Price, LeBlanc & Becker

[57] ABSTRACT

A vulcanizable acrylic rubber composition comprising an acrylic rubber containing an active halogen group and a carboxyl group, trithiocyanuric acid, and a metal salt of dithiocarbamic acid alone or together with thiuram sulfide gives a vulcanized product having very good compression set and tensile strength even if the secondary vulcanization is omitted.

11 Claims, No Drawings

ACRYLIC RUBBER COMPOSITION CONTAINING TRITHIOCGANURIC ACID, A METAL SUIT OF DITHIOCARBAMIC ACID AND A THIURAM SULFIDE

RELATED APPLICATION

This application is a continuation-in-part of application Ser. No. 438,010 filed on Nov. 20, 1989 now abandoned. The benefits of 35 USC 120 are requested relative to this earlier application.

BACKGROUND OF THE INVENTION

1. Field of the Invention

This invention relates to a vulcanizable acrylic rubber composition, and more particularly to a vulcanizable acrylic rubber composition that can produce vulcanized products having very good compression set and tensile strength even if the secondary vulcanization is omitted.

2. Description of the Prior Art

Heretofore, various acrylic rubber vulcanization systems using halogens at cross-linking sites have been known and have their own problems to be solved. That is, in the case of a vulcanization system based on a combination of polyvalent amines such as hexamethylenediamine carbamate and hexamethylenetetramine, and dibasic lead phosphite or metal oxide as an acid acceptor, the vulcanization speed is low and the compression set is poor when 2-chloroethyl vinyl ether is a cross-linking site, whereas when vinyl chloroacetate is a cross-linking site, the vulcanization speed is practically too high.

In the case of a vulcanization system based on a combination of fatty acid metal soap and sulfur or a sulfur donor, the vulcanization speed and the compression set are also poor when 2-chloroethyl vinyl ether is a cross-linking site, whereas when vinyl chloroacetate is a cross-linking site, the compression set is poor, though the vulcanization speed is high.

Furthermore, in the case of a vulcanization system based on a combination of a triazine derivative and a metal oxide [Japanese Patent Publication No. 50-15815 and Japanese Patent Application Kokai (Laid-open) No. 51-58451], acrylic rubber using 2-chloroethyl vinyl ether as a cross-linking site has a low vulcanization speed and a short Mooney scorch time, whereas acrylic rubber using vinyl chloroacetate as a cross-linking site has too high vulcanization speed to the contrary.

Besides, a vulcanization system based on a combination of trithiocyanuric acid and a zinc thiocarbamate derivative or thiuram sulfide are also known (Japanese Patent Publication No. 49-13215), and improves the disadvantage of so far proposed, vulcanization systems based on a combination of soap and sulfur, i.e., inconvenience in attaining a highest curing state by rapid curing, though the proposed vulcanization systems can meet most of the objects. It is said that a composition having a higher curing speed and a highest curing state can be obtained, and the vulcanized products have an improved storability.

However, the afore-mentioned vulcanization systems are effective for acrylic rubber using vinyl chloroacetate as a cross-linking site but are still not satisfactory for the requirements for high strength materials, omission of secondary vulcanization and rapid vulcanization.

SUMMARY OF THE INVENTION

An object of the present invention is to solve these problems encountered in the vulcanization system based on a combination of trithiocyanuric acid-metal salt of dithiocarbamic acid or thiuram sulfide for the so far known, active halogen group-containing acrylic rubber, and to provide a vulcanization system which can produce vulcanized products having distinguished compression set and tensile strength even if the secondary vulcanization is omitted.

DETAILED DESCRIPTION OF PREFERRED EMBODIMENTS

The present vulcanizable acrylic rubber composition that can attain the above-mentioned object contains acrylic rubber containing an active halogen group and a carboxyl group, trithiocyanuric acid, and at least one of a metal salt of dithiocarbamic acid and thiuram sulfide.

The acrylic rubber containing an active halogen group and a carboxyl group to be vulcanized is an elastomeric polymer obtained by copolymerization of about 60 to about 99.8% by weight of alkyl acrylate monomer, about 10 to about 0.1% by weight of an active halogen group-containing monomer, about 10 to about 0.1% by weight of a carboxyl group-containing monomer, and about 30 to 0% by weight of at least one of other monomers copolymerizable with the afore-mentioned respective monomers.

The alkyl acrylate monomer include, for example, alkyl acrylate, alkoxyalkyl acrylate, alkylthioalkyl acrylate, cyanoalkyl acrylate, etc.

The active halogen group-containing monomer is exemplified by the following monomers, where vinyl chloroacetate is preferably used.

(1) Vinyl chloroacetate, allyl chloroacetate, etc.

(2) Addition reaction product of a glycidyl compound such as glycidyl acrylate, glycidyl methacrylate, allylglycidyl ester, etc. with monochloroacetic acid.

The carboxyl group-containing monomer includes, for example, acrylic acid, methacrylic acid, ethacrylic acid, crotonic acid, vinylacetic acid, maleic acid, fumaric acid, itaconic acid, cinnamic acid, monomethyl maleate, monoethyl maleate, monobutyl maleate, etc.

Other monomers for the copolymerization includes, for example, monovinyl or monovinylidene unsaturated compounds such as styrene, α-methylstyrene, halogenated styrene, acrylonitrile, methacrylonitrile, acrylamide, methacrylamide, N-methylol acrylamide, hydroxyethyl acrylate, hydroxypropyl acrylate, hydroxyethyl methacrylate, vinyl acetate, vinyl chloride, vinylidene chloride, methyl methacrylate, ethyl methacrylate, cyclohexyl acrylate, benzyl acrylate, furfuryl acrylate, etc., and cross-linkable polyene compounds such as divinylbenzene, allyl acrylate, allyl methacrylate, alkyleneglycol diacrylate, alkyleneglycol dimethacrylate, polyalkyleneglycol diacrylate, polyalkyleneglycol dimethacrylate, trimethylolpropane triacrylate, etc.

As the metal salt of dithiocarbamic acid, compounds represented by the following general formula are used:

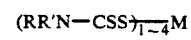

$$(RR'N-CSS)_{1-4}M$$

R: lower alkyl group,
R': lower alkyl group or phenyl group
M: mono- to tetra-valent metal preferably, zinc dimethyldithiocarbamate, zinc diethyldithiocarbamate, zinc dibutyldithiocarbamate, etc. can be used.

As the thiuram sulfide, compounds represented by the following general formula are used:

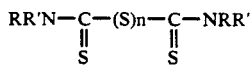

R and R': alkyl group, aralkyl group, cycloalkyl group or a heterocycle formed by combination of R and R'
n: an integer of 1 to 6
preferably, tetramethylthiuram disulfide, tetraethylthiuram disulfide, tetrabutylthiuram disulfide, tetramethylthiuram monosulfide, dipentamethylenethiuram sulfide, etc. can be used.

The present vulcanization system contains about 0.1 to about 10 parts by weight, preferably about 0.3 to about 2 parts by weight, of trithiocyanuric acid, about 0.1 to about 10 parts by weight, preferably about 0.3 to about 2 parts by weight, of a metal salt of dithiocarbamic acid, about 0.01 to about 5 parts by weight, preferably about 0.05 to about 2 parts by weight, of thiuram sulfide, as essential components, per 100 parts by weight of acrylic rubber containing an active halogen group and a carboxyl group, and more preferably about 0.05 to about 1 part by weight of thiuram sulfide is used on the basis of about 0.3 to about 2 parts by weight of a metal salt of dithiocarbamic acid.

These mixing ratios are selected as preferable ranges on the basis of properties and characteristics such as vulcanization speed, storage stability, processing safety, and physical properties, heat resistance or compression set of vulcanized products, etc. When the essential components of vulcanization system are used below the lower limits of the mixing ratios, the vulcanization speed is considerably lowered, and the general physical properties of vulcanized products are not satisfactory, whereas above the upper limits of the mixing ratios the vulcanization speed generally becomes higher, but storage stability, processing safety, the general physical properties of vulcanized products, etc. are deteriorated.

The present composition can be prepared by mixing these essential components of vulcanization system together with other additives such as a reinforcing agent, a filler, an antioxidant, a stabilizer, a plasticizer, a lubricant, etc. by the ordinary method, for example, roll mixing, Bambury mixing, solution mixing, etc. Vulcanization temperature for the thus prepared composition is usually 150° C. or higher, at which the vulcanization is carried out by press vulcanization and secondary vulcanization or steam vulcanization.

With the present vulcanization system, the vulcanization speed is higher and a considerably distinguished compression set can be obtained even if the secondary vulcanization is omitted. Furthermore, the secondary vulcanized products have better effects on these properties than the conventional vulcanization system. These effect are remarkable particularly when a metal salt of dithiocarbamic acid and thiuram disulfide are used together.

The present invention will be described in detail below, referring to Examples and Comparative Examples.

EXAMPLES 1 to 7

One hundred parts by weight of acrylic rubber containing an active halogen group and a carboxyl group, which was a copolymer consisting of 49% by weight of ethyl acrylate, 25% by weight of n-butyl acrylate, 24% by weight of 2-methoxyethyl acrylate, 1:5% by weight of vinyl chloroacetate and 0.5% by weight of methacrylic acid, one part by weight of stearic acid, 55 parts by weight of FEF carbon black, 2 parts by weight of an antioxidant (Noguard 445, made by Uniroyal Co.), 0.5 parts by weight of trithiocyanuric acid and parts by weight given in the following Table of at least one of a metal salt of dithiocarbamic acid and thiuram sulfide were mixed, and the mixture was kneaded in 8-inch open rolls at a temperature of 30° to 40° C. for about 30 minutes.

Mooney scorch time (5 point elevation time) of the thus obtained kneaded mixture, physical properties of press vulcanized products (180° C., 10 min.) of the kneaded mixture, and physical properties of secondary vulcanized products (175° C., 4 hrs.) of the press vulcanized products were measured. The results are shown in the following Table.

In Comparative Examples 1–3 everything was the same as in Examples 1–7 except that the active halogen-containing acrylic rubber was a copolymer consisting of 48.5% by weight of ethyl acrylate, 25% by weight of on-butyl acrylate, 24% by weight of 2-methoxyethyl acrylate and 2.5% by weight of vinyl chloroacetate was used.

TABLE

|  | Example No. | | | | | | | Comp. Ex. | | |
|---|---|---|---|---|---|---|---|---|---|---|
|  | 1 | 2 | 3 | 4 | 5 | 6 | 7 | 1 | 2 | 3 |
| [Composition components (Pts. By Wt.)] | | | | | | | | | | |
| Zinc diethylthiocarbamate |  |  | 1.5 | 1.5 |  |  |  |  |  | 1.5 |
| Zinc dibutylthiocarbamate | 1.5 |  |  |  | 1.5 | 1.5 | 1.5 | 1.5 |  |  |
| Tetramethylthiuram disulfide |  | 1.5 | 0.2 |  | 0.2 |  |  |  | 1.5 | 0.2 |
| Dipentamethylenethiuram sulfide |  |  |  |  |  | 0.2 |  |  |  |  |
| Tetraethylthiuram sulfide |  |  |  | 0.2 |  |  | 0.2 |  |  |  |
| [Kneaded mixture] | | | | | | | | | | |
| Mooney scorch time (121° C.) (min.) | 13.5 | 2.6 | 11.2 | 11.5 | 12.1 | 11.2 | 12.5 | 16.6 | 3.6 | 14.2 |
| [Press vulcanized products] | | | | | | | | | | |
| Hardness (JIS A) (point) | 62 | 63 | 63 | 63 | 63 | 63 | 63 | 62 | 64 | 63 |
| Tensile strength (kg/cm²) | 112 | 116 | 115 | 114 | 112 | 113 | 114 | 105 | 108 | 107 |
| Elongation (%) | 282 | 175 | 272 | 278 | 275 | 265 | 276 | 265 | 162 | 250 |
| Compression set (150° C., 70 hrs. ) (%) | 28 | 21 | 21 | 20 | 21 | 20 | 20 | 30 | 26 | 26 |
| [Secondary vulcanized products] | | | | | | | | | | |
| Hardness (JIS A) (point) | 64 | 65 | 64 | 64 | 64 | 64 | 64 | 64 | 66 | 64 |
| Tensile strength (kg/cm²) | 122 | 124 | 126 | 124 | 128 | 125 | 124 | 118 | 122 | 123 |
| Elongation (%) | 248 | 152 | 232 | 238 | 240 | 225 | 245 | 242 | 148 | 228 |

TABLE-continued

| | Example No. | | | | | | | Comp. Ex. | | |
|---|---|---|---|---|---|---|---|---|---|---|
| | 1 | 2 | 3 | 4 | 5 | 6 | 7 | 1 | 2 | 3 |
| Compression set (150° C., 70 hrs.) (%) | 11 | 11 | 11 | 11 | 11 | 11 | 11 | 14 | 14 | 14 |

What is claimed is:

1. A vulcanizable acrylic rubber composition, which comprises an acrylic rubber containing an active halogen group and a carboxyl group, trithiocyanuric acid, a metal salt of dithiocarbamic acid, and a thiuram sulfide.

2. A vulcanizable acrylic rubber composition according to claim 1 wherein 0.01 to 5 parts by weight of the thiuram sulfide is contained per 100 parts by weight of the acrylic rubber containing an active halogen group and a carboxyl group.

3. A vulcanizable acrylic rubber composition according to claim 1 wherein 0.3 to 2 parts by weight of the metal salt of dithiocarbamic acid and 0.05 to 1 part by weight of the thiuram disulfide were contained per 100 parts by weight of the acrylic rubber containing an active halogen group and a carboxyl group.

4. A vulcanizable acrylic rubber composition according to claim 1, wherein the acrylic rubber containing an active halogen group and a carboxyl group is an elastomeric copolymer obtained by copolymerization of 60 to 99.8% by weight of alkyl acrylate monomer, 10 to 0.1% by weight of an active halogen-containing monomer, 10 to 0.1% by weight of a carboxyl group-containing monomer, and 30 to 0% by weight of at least one of other monomers copolymerization with the aforementioned monomers.

5. A vulcanizable acrylic rubber composition according to claim 4 wherein the alkyl acrylate monomer is at least one of alkyl acrylate and alkoxyalkyl acrylate.

6. A vulcanizable acrylic rubber composition according to claim 4 wherein the active halogen group-containing monomer is vinyl chloroacetate, allyl chloroacetate or an addition reaction product of glycidyl compound-monochloroacetic acid.

7. A vulcanizable acrylic rubber composition according to claim 4 wherein the carboxyl group-containing monomer is an unsaturated monocarboxylic acid or an unsaturated dicarboxylic acid monoalkyl ester.

8. A vulcanizable acrylic rubber composition according to claim 1 wherein the metal salt of dithiocarbamic acid is a compound represented by the general formula:

$$(RR'N-CSS)_{1-4}M$$

wherein
R: lower alkyl group,
R': lower alkyl group or phenyl group
M: monovalent to tetravalent metal.

9. A vulcanizable acrylic rubber composition according to claim 1 wherein the thiuram sulfide is a compound represented by the general formula $$RR'N-\underset{S}{\overset{\|}{C}}-(S)n-\underset{S}{\overset{\|}{C}}-NRR'$$

wherein
R and R': alkyl group, aralkyl group, cycloalkyl group or a heterocycle formed by combination of R and R'
n: an integer of 1 to 6.

10. A vulcanizable acrylic rubber composition according to claim 1 wherein 0.1 to 10 parts by weight of trithiocyanuric acid is contained per 100 parts by weight of the acrylic rubber containing an active halogen group and a carboxyl group.

11. A vulcanizable acrylic rubber composition according to claim 1 wherein 0.1 to 10 parts by weight of the metal salt of dithiocarbamic acid is contained per 100 parts by weight of the acrylic rubber containing an active halogen group and a carboxyl group.

* * * * *